(12) United States Patent
Madden

(10) Patent No.: US 8,520,838 B1
(45) Date of Patent: Aug. 27, 2013

(54) COMBINATION CELLULAR TELEPHONE STAND AND SAFETY SPACER

(76) Inventor: Andrew W. Madden, Boca Raton, FL (US)

( * ) Notice: Subject to any disclaimer, the term of this patent is extended or adjusted under 35 U.S.C. 154(b) by 0 days.

(21) Appl. No.: 13/370,459

(22) Filed: Feb. 10, 2012

(51) Int. Cl.
*H04M 1/00* (2006.01)

(52) U.S. Cl.
USPC ........ 379/455; 248/683; 248/176.1; 248/371; 248/205.5; 379/454

(58) Field of Classification Search
USPC ................ 248/917–924, 205.5, 205.6, 205.8, 248/206.2, 206.3, 302, 303, 683, 465.1, 444, 248/445, 455, 456, 176.1, 371; 379/454, 379/455
See application file for complete search history.

(56) References Cited

U.S. PATENT DOCUMENTS

| | | | | |
|---|---|---|---|---|
| 1,797,610 A * | 3/1931 | Hurlburt | | 248/444 |
| 2,936,148 A * | 5/1960 | Gralewicz | | 248/308 |
| 2,971,286 A * | 2/1961 | Ernst | | 248/464 |
| 3,660,861 A * | 5/1972 | Delmonico | | 15/209.1 |
| 5,078,356 A * | 1/1992 | Adams | | 248/206.2 |
| 5,313,337 A * | 5/1994 | Byers | | 359/872 |
| 5,386,960 A * | 2/1995 | O'Brien | | 248/205.5 |
| 5,595,364 A * | 1/1997 | Protz, Jr. | | 248/205.5 |
| 5,673,884 A * | 10/1997 | Yemini | | 248/205.5 |
| 5,971,555 A * | 10/1999 | Wilcox et al. | | 359/872 |
| 6,131,865 A * | 10/2000 | Adams | | 248/206.2 |
| 6,182,934 B1 * | 2/2001 | Kelley | | 248/304 |
| 6,619,685 B2 * | 9/2003 | Teague | | 280/477 |
| 6,869,053 B2 * | 3/2005 | Adams, IV | | 248/206.2 |
| 6,880,849 B2 * | 4/2005 | Teague | | 280/477 |
| 7,508,932 B1 | 3/2009 | Bergh | | |
| 7,597,225 B2 | 10/2009 | Badillo et al. | | |
| 2007/0075210 A1 * | 4/2007 | Yang | | 248/465.1 |
| 2011/0284599 A1 * | 11/2011 | Sternick | | 224/191 |

* cited by examiner

*Primary Examiner* — Nkeisha Smith
(74) *Attorney, Agent, or Firm* — Ladas & Parry LLP

(57) ABSTRACT

A device for providing a stand with legs to support a cell phone on a flat surface, which stand may be pivoted into a spacer to maintain spacing between the phone and a user's head.

1 Claim, 3 Drawing Sheets

COMBINATION CELLULAR TELEPHONE STAND AND SAFETY SPACER

FIELD OF THE INVENTION

The present invention relates to devices for supporting cellular telephones (cell phones) as well as for providing enhanced safety in their usage.

BACKGROUND ART

Devices for holding cell phones are well known to the art and include myriad cases and covers such as shown in U.S. Pat. No. 7,597,225 for a carrying case with selectively adjustable stand and U.S. Pat. No. 7,508,932 for a cell phone holder headband.

It is known in the field that issues regarding the potential deleterious effects of exposure to electromagnetic radiation have arisen. To reduce undue direct exposure to radiation, "Bluetooth" or other "hands free" devices have been employed whereby the phone is not in direct contact with the head of the user. Alternatively, simply holding the phone in spaced relation to the user's head has been employed as a safety measure. A minimum spacing of phone from head of one inch has been believed to be effective.

SUMMARY OF THE INVENTION

The apparatus of the present invention comprises a U-shaped bent wire framework having a central portion and depending parallel legs and a mounting suction cup adapted to secure the wire framework to a cell phone while accommodating rotation of the framework between a "supporting stand" position and a "safety spacing" position. The free ends of the legs are covered by elastomeric cylindrical cups or elastomeric coating to provide a soft, non-skid surface.

In usage, the framework is attached to a cell phone by the suction cup. The legs may be rotated between a supporting stand position in which the legs are canted with respect to the phone to support the phone on a flat surface. Alternatively, the legs, which are spaced apart slightly greater than the width of the cell phone, may be rotated to provide projecting spacers between a user's head and the phone itself.

For a better understanding of the invention and a full appreciation of its attendant advantages, reference should be made to the following detailed description taken in conjunction with the accompanying drawings.

DETAILED DESCRIPTION OF THE INVENTION

Figure 1:
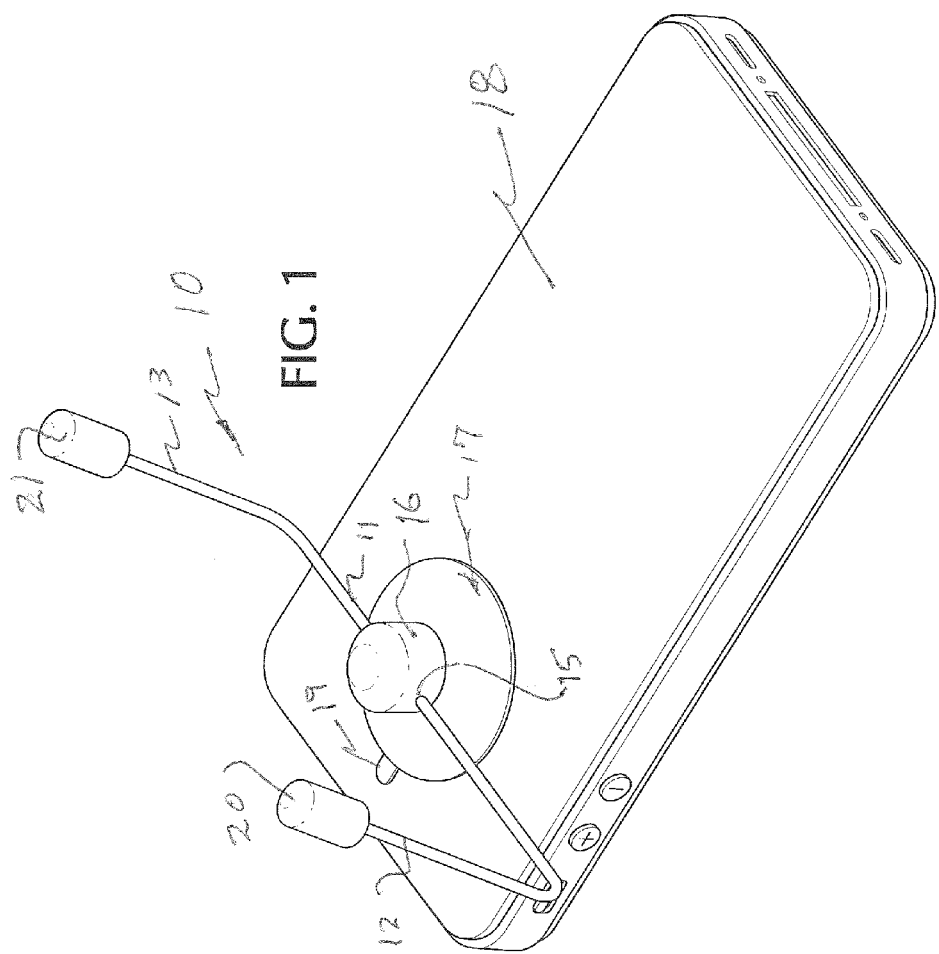
FIG. 1 is a perspective view of the framework of the invention in a "stand" mode.
Figure 2:
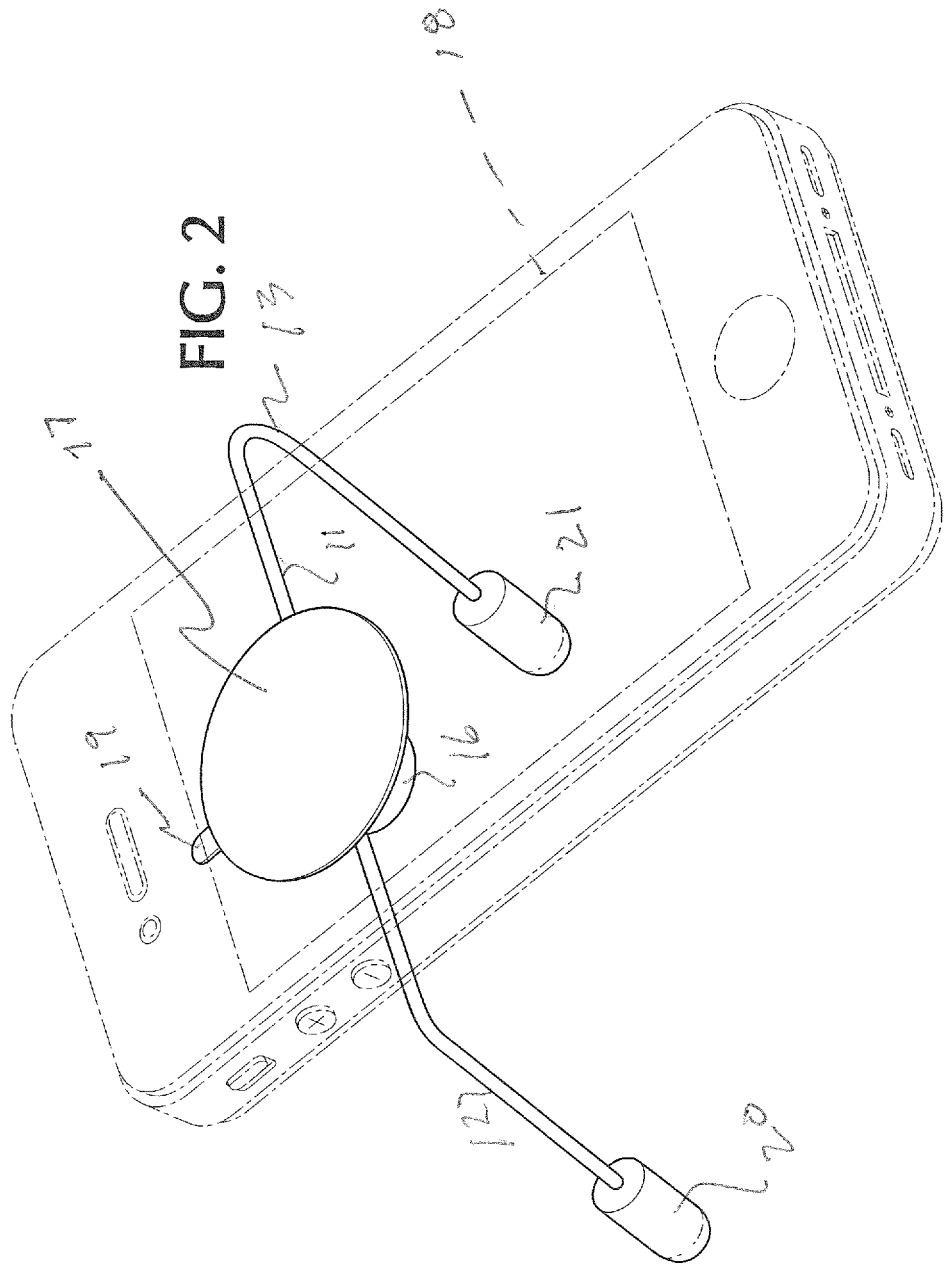
FIG. 2 is a perspective view of the framework of the invention in a "talk mode.

With reference FIGS. 1 and 2, the combined cell phone stand and safety spacer of the present invention comprises a U-shaped framework 10 having a central axle portion 11 with parallel legs 12, 13 projecting therefrom. An elastomeric suction cup 17 with stem 16 attaches the framework to the phone.

The axle portion 11 of the framework is supported in a bore 15 formed in the cylindrical stein 16 projecting outwardly from the suction cup 17 (shown flattened but concave when at rest) and attached to a compact cell phone or "smart phone" 18 such as an Apple® "iPhone." The round suction cup 17 includes a tab 19 which may be grasped to remove the suction cup and supported framework from attachment to the phone 18.

Advantageously, the ends of the legs 12, 13 mount friction cap member 20, 21 applied by force fitting or formed by dipping the legs 12, 13 into or by coating the ends with an elastomer.

Figure 3:
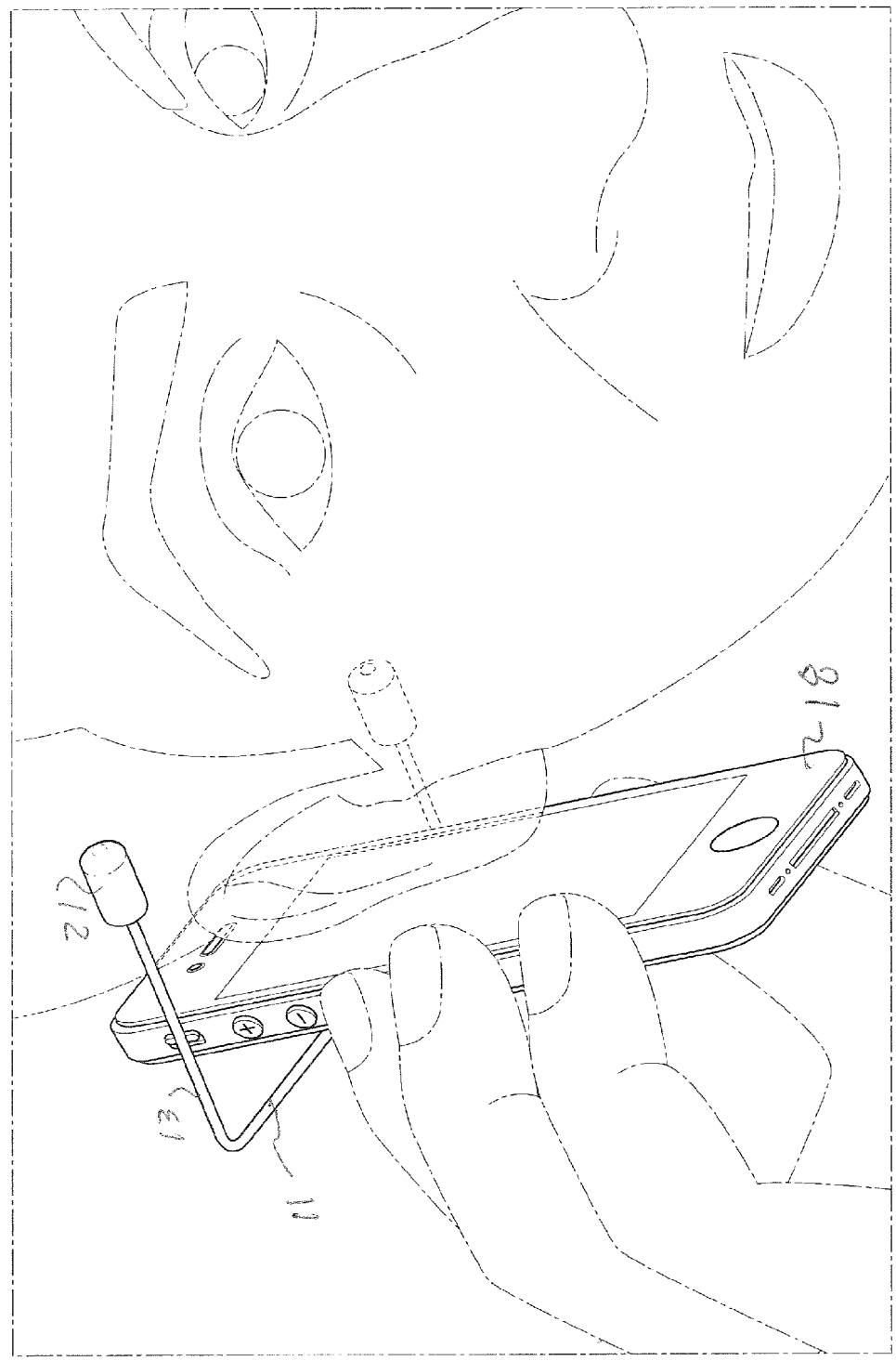
FIG. 3 is a perspective schematic of the invention in a "talk mode."

In use, the framework 10 is attached to the cell phone 18 by the suction cup 17. The legs 12, 13 may be rotated into the "stand" position of FIG. 1 in which the phone 18 may rest on a flat surface for viewing and/or listening to content or otherwise using the phone in a "speaker" mode. Alternatively, the legs 12, 13 can be rotated into the "safety" position of FIG. 3 in which the phone is spaced at least one inch from the user's head to reduce any deleterious effects of radiation by contact.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A combination generally parallelepiped cell phone which is to be prevented from directly contacting a head of a user and a detachable stand and safety mechanism therefor, said detachable stand and safety mechanism, consisting of:
    (a) a U-shaped wire framework having a central axle and depending parallel legs of predetermined length of at least one inch;
    (b) a detachable elastomeric suction cup means having a stem portion defining a bore therein fastened to said cell phone above a bottom edge of the phone;
    (c) said axle being supported in said bore;
    (d) elastomeric non-slip friction means are mounted on the ends of said legs;
    (e) whereby said legs are adapted to be rotated between a first "stand" position to support said cell phone on a flat horizontal surface in a canted relation to its bottom edge and a second "safety spacing" position to provide at least one inch of space between said phone and the head of a user.

* * * * *